United States Patent [19]

Hadar

[11] Patent Number: 5,236,130
[45] Date of Patent: Aug. 17, 1993

[54] DRIP IRRIGATION APPARATUS

[75] Inventor: Yoram Hadar, Haifa, Israel

[73] Assignee: Lego M. Lemelshtrich Ltd., Natania, Israel

[21] Appl. No.: 831,015

[22] Filed: Feb. 4, 1992

[30] Foreign Application Priority Data

Mar. 15, 1991 [IL] Israel .......................................... 97564

[51] Int. Cl.⁵ .............................................. B05B 15/00
[52] U.S. Cl. ...................................... 239/542; 239/547
[58] Field of Search ................................ 239/542, 547

[56] References Cited

U.S. PATENT DOCUMENTS

| | | | |
|---|---|---|---|
| 4,022,384 | 5/1977 | Hoyle et al. | 239/542 |
| 4,254,791 | 3/1981 | Bron | 239/542 X |
| 4,687,143 | 8/1987 | Gorney et al. | 239/542 |
| 4,715,543 | 12/1987 | Rinkewich | 239/542 |
| 4,728,042 | 3/1988 | Gorney et al. | 239/542 |
| 4,824,025 | 4/1989 | Miller | 239/542 |
| 5,111,996 | 5/1992 | Eckstein | 239/542 |

*Primary Examiner*—Andres Kashnikow
*Assistant Examiner*—William Grant
*Attorney, Agent, or Firm*—Benjamin J. Barish

[57] ABSTRACT

A drip irrigation unit for insertion into a water supply pipe for reducing the flow through an outlet opening in the water supply pipe, includes a cylindrical member of a deformable elastomeric material fixed within the water supply pipe. The cylindrical member is formed with an inlet opening therethrough for conducting water from the interior of the water supply pipe to the outer face of the cylindrical member, and an outlet cavity in the outer face of the cylindrical member alignable with the outlet opening in the water supply pipe. A regulated flow-reducing pathway between the inlet opening and outlet cavity includes multiple, series-connected pressure-compensating chambers whose cross-sectional areas are changed by the deformation of the elastomeric cylindrical member to regulate the flow of the water in response to changes in the water supply pressure.

12 Claims, 3 Drawing Sheets

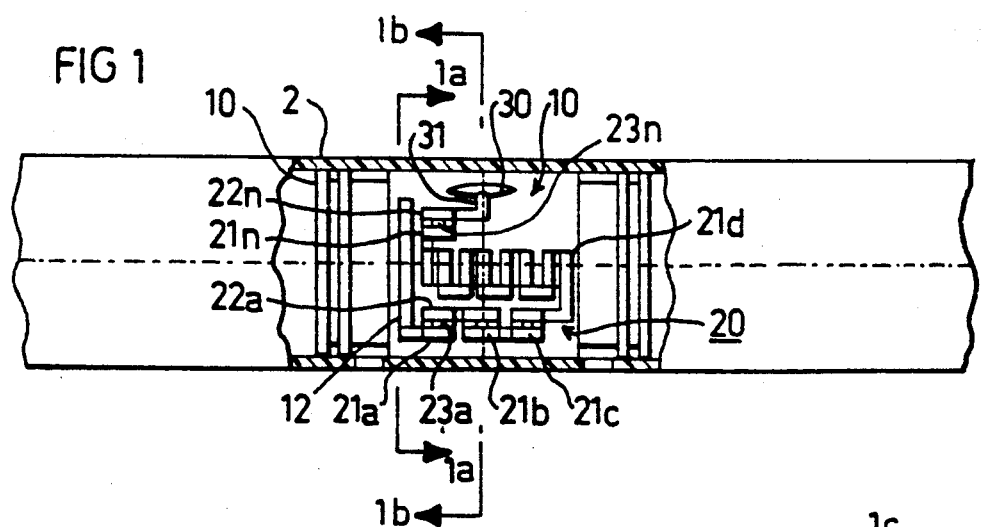
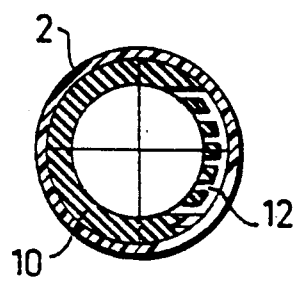
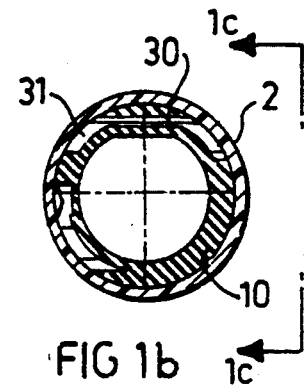
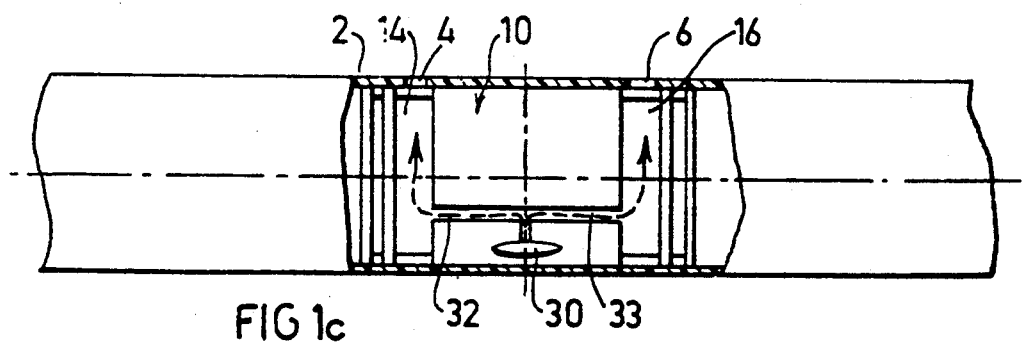
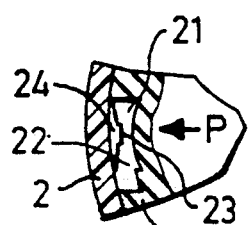
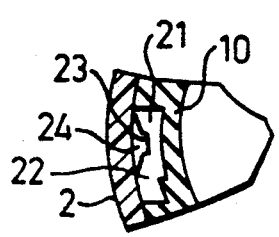
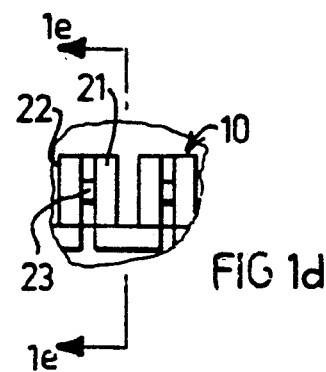

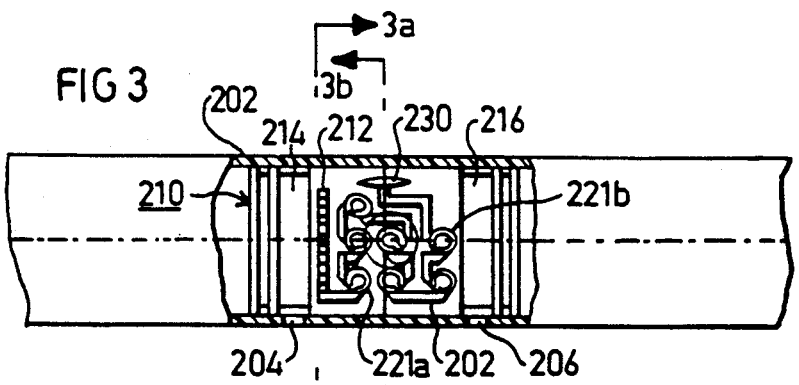
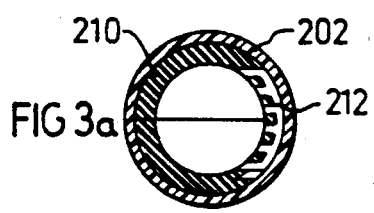
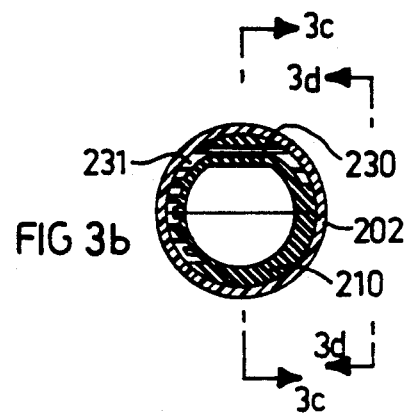
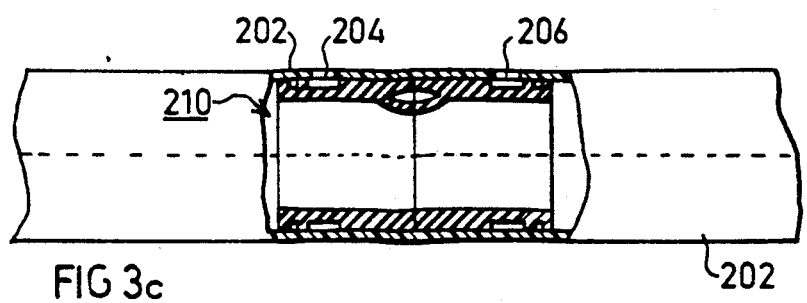
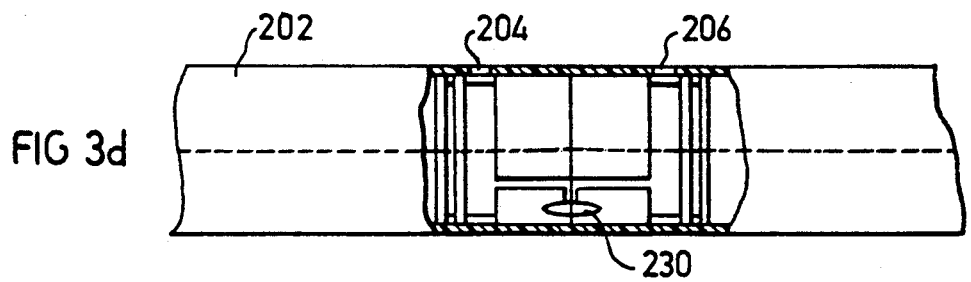
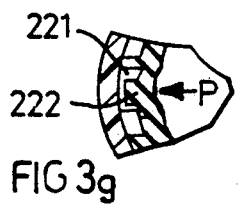
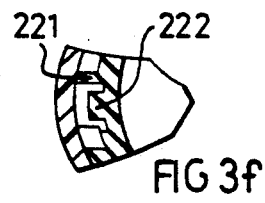
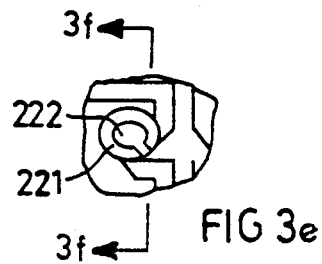

DRIP IRRIGATION APPARATUS

FIELD AND BACKGROUND OF THE INVENTION

The present invention relates to drip irrigation apparatus, and particularly to such apparatus effective to regulate the flow of the water therefrom in response to changes in the water supply pressure.

One known construction of apparatus of this type includes a drip irrigation unit for insertion into a water supply pipe to reduce the flow through an outlet opening in the water supply pipe, comprising: a cylindrical member having an outer diameter substantially equal to the inner diameter of the water supply pipe and fixed therein with the outer face of the cylindrical member in contact with the inner face of the water supply pipe; the cylindrical member being formed with an inlet opening therethrough from its inner face to its outer face for conducting the water from the interior of the water supply supply pipe to the outer face of the cylindrical member, an outlet cavity in the outer face of the cylindrical member alignable with the outlet opening in the water supply pipe, and a regulated flow-reducing pathway between the inlet opening and outlet cavity.

Examples of apparatus of this type of known construction are illustrated in U.S. Pat. No. 4,519,543, and U.S. Pat. No. 4,687,143. In these known constructions, the cylindrical member is of rigid plastic material and includes a flexible membrane or the like to produce the regulation in response to changes in the water supply pressure. Since such constructions involve a multiplicity of parts, they are relatively expensive to produce and to assemble into the water supply pipe.

U.S. Pat. No. 4,824,025 discloses a drip irrigation unit constituted of a cylindrical member made of a deformable elastomeric material in which the flow regulating means is a deformable tubular member diametrically traversing the cylinder, the tubular member being deformable by the fluid pressure in the conduit line to restrict the flow of fluid therethrough. In such a drip irrigation unit, however, the diametrically traversing tubular member also interferes with the flow of the water through the line, and thereby produces a pressure loss in the water flowing through the line.

OBJECTS AND BRIEF SUMMARY OF THE INVENTION

An object of the present invention is to provide a drip irrigation unit of the foregoing type but which has advantages in the above respects as will be described more particularly below.

According to the present invention, there is provided a drip irrigation unit of the foregoing type characterized in that the cylindrical member is made of a deformable elastomeric material, and that the regulated flow-reducing pathway includes a plurality of series-connected multiple pressure-compensating chambers whose cross-sectional areas are changed by the deformation of the elastomeric cylindrical member to regulate the flow of the water in response to changes in the water supply pressure.

According to further features in the embodiments of the invention described below, at least one of the multiple pressure compensating chambers is constituted of a recess formation on the outer face of the cylindrical member and cooperable with the inner face of the water supply pipe, and/or a bore extending transversely through a wall of the cylindrical member leading from a first point on its outer face to a second point on its outer face.

Several embodiments of the invention are described below for purposes of example.

According to one described embodiment, the recess formation includes a pair of parallel spaced grooves joined by a transverse groove of shallower depth than the parallel spaced grooves to define, with the inner face of the water supply pipe, a restricted passageway having a cross-sectional area which is changed by the deformation of the elastomeric cylindrical member to regulate the flow of water in response to changes in the water supply pressure. More particularly, the recess information in that described embodiment includes a plurality of pairs of the parallel spaced grooves connected in series, with one groove of each pair joined to the other groove of the pair by the transverse groove.

According to a second described embodiment, the recess formation includes a groove bounded by a bottom face and a pair of side faces, and at least one flat-top projection integrally formed in the bottom face of the groove, and of smaller height and thickness than the depth and width, respectively, of the groove to define, with the inner face of the water supply pipe, a restricted passageway having a cross-sectional area that is changed by the deformation of the elastomeric cylindrical member to regulate the flow of water in response to changes in the water supply pressure. More particularly, in that described embodiment, the groove includes a plurality of such projections spaced along the length thereof, and the recess formation includes a plurality of such grooves connected in series each formed with at least one of the flat-top projections.

According to a third described embodiment, the recess formation includes an annular recess to define, with the inner face of the water supply pipe, an annular flow-path producing a cyclonic flow of the water therethrough, and having a cross-sectional area which is changed by the deformation of the elastomeric cylindrical member to regulate the flow of water in response to changes in the water supply pressure. More particularly, the recess formation includes a plurality of such annular recesses connected in series.

According to another feature of the preferred embodiments of the invention described below, the regulated flow-reducing pathway further includes a bore extending transversely through the thickness of the cylindrical member leading from a first point on its outer face to a second point on its outer face, the first point communicating with the recess formation, and the second point communicating with the outlet cavity, the cross-sectional area of said bore being changed by the deformation of the elastomeric cylindrical member to regulate the flow of water therethrough in response to changes in the water supply pressure.

As will be more apparent from the description below, drip irrigation units constructed in accordance with the foregoing features of the present invention effectively regulate the water flow without interfering with the flow through the water supply pipe such as to produce a significant pressure loss, for example as compared to the above-mentioned U.S. Pat. No. 4,824,025. Moreover, since the regulation is effected by a plurality of pressure compensating chambers connected in series and having cross-sectional areas which are changed by the deformation of the elastomeric cylindrical member, a more effective regulation is provided. Further, such drip irrigation units are simpler, less expensive to produce, and less expensive to assemble into the water supply pipe, as compared to the other known drip irrigation units briefly described above.

Further features and advantages of the invention will be apparent from the description below.

BRIEF DESCRIPTION OF THE DRAWINGS

The invention is herein described, by way of example only, with reference to the accompanying drawings, wherein:

FIG. 1 is a side elevational view, partly in section, illustrating one form of drip irrigation unit constructed in accordance with the present invention as assembled in a water supply pipe; FIGS. 1a, 1b and 1c are sectional views taken along lines 1a—1a and 1b—1b of FIG. 1 and 1c—1c of FIG. 1b, respectively; FIG. 1d is an enlarged fragmentary view illustrating a portion of the drip irrigation unit of FIG. 1, FIG. 1e being a sectional view along line 1e—1e of FIG. 1d under low-pressure conditions in the water supply pipe; and FIG. 1f is a view similar to that of FIG. 1e but under high-pressure conditions in the water supply pipe;

FIG. 2 is a side elevational view illustrating a second form of drip irrigation unit constructed in accordance with the present invention, FIG. 2a being a side elevational view, partly in section, illustrating the unit of FIG. 2 installed in a water supply pipe, and FIG. 2b being a sectional view along line 2b—2b of FIG. 2a;

and FIG. 3 is a side elevational view, partly in section, illustrating a third form of drip irrigation unit constructed in accordance with the present invention as installed in a water supply pipe, FIGS. 3a and 3b being sectional views along lines 3a—3a and 3b—3b of FIG. 3, FIG. 3c being a sectional view along line 3c—3c of FIG. 3b, FIG. 3d being a side elevational view, partly in section, along line 3d—3d of FIG. 3b, FIG. 3e being an enlarged fragmentary view, FIG. 3f being a sectional view along line 3f—3f of FIG. 3e under low-pressure conditions in the water pipe, and FIG. 3g being a view similar to that of FIG. 3f but under high-pressure conditions in the water supply pipe.

DESCRIPTION OF PREFERRED EMBODIMENTS

Figure 2:
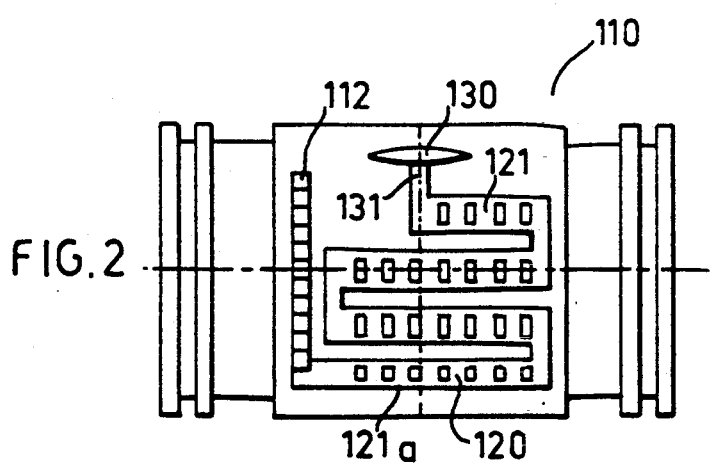

With reference to FIGS. 1-1e, there is shown a water supply pipe, generally designated 2, formed with two outlet openings 4, 6 (FIG. 1c) for outletting the water after its flow has been reduced by a drip irrigation unit, generally designated 10, fixed within the water supply pipe. It will be appreciated that the water supply pipe 2 is formed with a pair of outlet openings 4, 6 at equally spaced intervals along its length, with one of the drip irrigation units 10 fixed within the pipe in alignment with each pair of outlet openings.

Each drip irrigation unit 10 is made of a single, cylindrical member, of a deformable elastomeric material. Examples of such materials are natural and synthetic rubber, polyurethane, or the like.

Cylindrical member 10 has an outer diameter substantially equal to the inner diameter of the water supply pipe 2 and is fixed therein with the outer face of the cylindrical member in contact with the inner face of the water supply pipe. A plurality of inlet openings 12 (FIGS. 1, 1a) extend through the cylindrical member 10 from its inner face to its outer face for conducting the water from the interior of the water supply pipe to the outer face of the cylindrical member. Cylindrical member 10 is further formed with a pair of outlet cavities 14, 16, of annular configuration aligned with the outlet openings 4, 6, respectively, in the water supply pipe, and with a regulated flow-reducing pathway between the inlet openings 12 and the two outlet cavities 14, 16.

The regulated flow-reducing pathway includes two sections, generally designated 20 and 30, respectively, connected in series between the inlet openings 12 and the two outlet cavities 14, 16. Section 20 of the regulated flow-reducing pathway includes a recess formation on the outer face of cylindrical member 10 and is cooperable with the inner face of the water supply pipe 2 such that the cross-sectional area of the recess formation is changed by the deformation of cylindrical member 10 to regulate the flow of the water in response to changes in the water supply pressure. Section 30 of the regulated flow-reducing pathway includes a bore extending transversely through the thickness of cylindrical member 10, connecting together different points on its outer face, such that the cross-sectional area of the bore also is changed by the deformation of the cylindrical member to regulate the flow of the water in response to the changes in the water supply pressure.

More particularly, the recess formation 20 of the regulated flow-reducing pathway includes a plurality of pairs of parallel spaced grooves, 21a, 22a-21n, 22n, connected in series between the inlet openings 12 and the bore 30, as shown particularly in FIG. 1. Each pair of parallel spaced grooves 21a, 22a-21n, 22n is joined by a transverse groove 23a-23n of shallower depth than the parallel spaced grooves of the respective pair. This is more particularly shown in FIG. 1d, wherein it will be seen that the two grooves 21, 22 of the respective pair are joined by transverse groove 23 of shallower depth. Thus, the transverse groove 23 defines a restricted passageway 24 between each pair of spaced grooves 21, 22.

FIG. 1e illustrates the restricted passageway 24 under low-pressure conditions in the water supply pipe 2; whereas FIG. 1f illustrates this passageway 24 under high-pressure conditions in the water supply pipe. Thus, when the water pressure is low, the restricted passageway 24 is relatively large (FIG. 1e); but under high-pressure conditions (FIG. 1f), the cylindrical member 10, because of its elastomeric nature, is deformed outwardly to decrease the cross-sectional area of the restricted passageway 24.

It will thus be seen that the deformation of cylindrical member 10 will effectively control the cross-sectional area of the restricted passageway 24 between each pair of grooves 21, 22 in the recess formation 20, to regulate the flow of the water from the inlet openings 12 to the bore 30 in response to changes in the water supply pressure.

Bore 30 is also effective to regulate the flow in response to changes in the water supply pressure. Thus, as shown particularly in FIG. 1b, bore 30 extends transversely through the wall of cylindrical member 10 and leads from a first point on its outer face to a second point on its outer face. The first point at one end of bore 30 is connected by a groove 31 to the last pair 21n, 22n, of grooves in the recess formation 20, so that this point constitutes the inlet end to bore 30. The second point at the opposite end of bore 30, which constitutes its outlet end, is connected by a pair of grooves 32, 33 (FIG. 1c) to the two annular outlet cavities 14, 16 formed on the outer face of cylindrical member 10.

As shown particularly in FIGS. 1 and 1c, bore 30 is of elliptical cross-section, with its major axis extending parallel to the longitudinal axis of the cylindrical member 10. Because of the elastomeric nature of the cylindrical member 10, the cross-sectional area of bore 30 will also be changed so as to regulate the flow of the water therethrough in response to the water pressure in the water supply pipe 2.

The drip irrigation apparatus illustrated in FIGS. 1-1f operates as follows:

The water supplied from the interior of the water supply pipe 2 enters the interior of each of the drip irrigation units 10 fixed along the length of the pipe and passes from the interior of the pipe via inlet openings 12 to the outer surface of the unit. From the inlet openings 12, the water passes through the plurality of pairs of grooves 21a, 22a-21n, 22n of the recess formation 20, through groove 31, bore 30, and then branches via the two grooves 32, 33 and the two outlet annular cavities 14, 16 through the outlet openings 4, 6 in the water supply pipe 2.

During this passage of the water, the plurality of groove pairs 21a, 22a-21n, 22n of the recess formation 20 is effective both to reduce the flow of the water and also to regulate the flow in response to changes in the water supply pressure. Thus, the transverse groove 23 (e.g., FIGS. 1d-1f) extending across each pair of the grooves 21, 22 in recess formation 20 provides a restricted passageway 24 for the flow of the water through each pair of grooves. The deformable nature of the drip irrigation unit 10 causes the cross-sectional area of passageway 24 to decrease, upon an increase in the pressure of the water within the water supply pipe 2, so as to regulate the flow of the water in response to changes in the water supply pressure.

Bore 30 is also effective to regulate the flow of the water to the outlet cavities 14, 16, and thereby through the outlet openings 4, 6 in the water supply pipe 2. Thus, an increase in the pressure in the water supply pipe 2 will deform the walls of unit 10 outwardly, to decrease the cross-sectional area of bore 30 (see particularly FIG. 1b), to thereby reduce the flow through the bore, and the annular cavities 14, 16 and outlet openings 4, 6. The water flowing out through bore 30 is fed via the two grooves 32, 33 (FIG. 1c) to the outlet cavities 14, 16 aligned with the outlet openings 4, 6 in the water supply pipe.

Figure 2A:
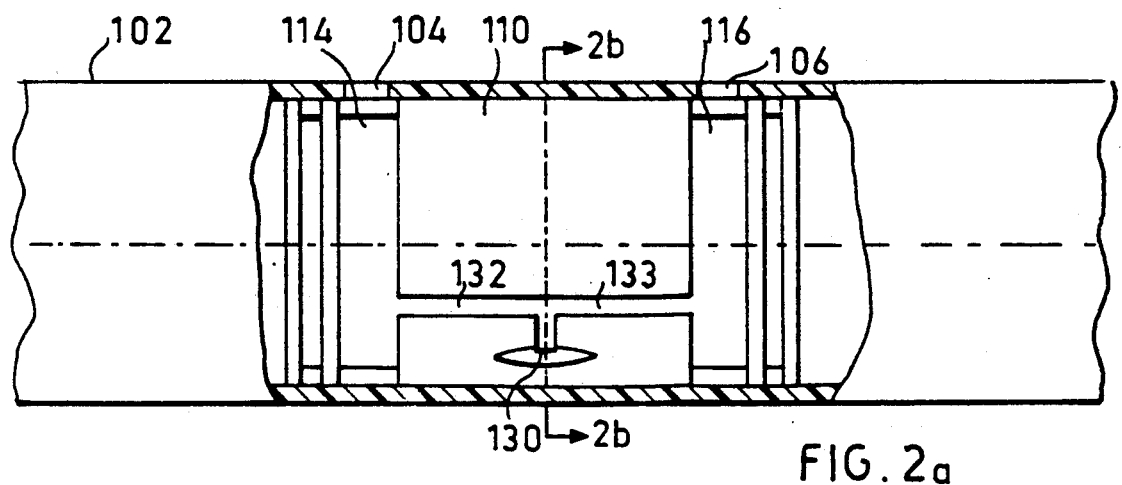
Figure 2B:
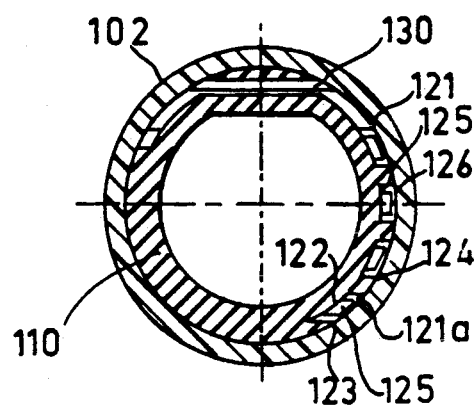

FIGS. 2, 2a and 2b illustrate a second form of drip irrigation apparatus constructed in accordance with the present invention. In the apparatus illustrated in these figures, the water supply pipe 102 is also provided with a pair of outlet openings 104, 106 at spaced intervals, each pair being cooperable with a drip irrigation unit, generally designated 110, in the form of a cylindrical member made of elastomeric material and fixed within the water supply pipe 102, as described above with respect to the FIG. 1 embodiment.

The drip irrigation unit 110 in FIG. 2, as in the FIG. 1 embodiment, also includes a plurality of inlet openings 112 for conducting the water from the inner face of the unit to its outer face, and a pair of annular outlet cavities 114, 116 aligned with the outlet openings 104, 106 in the water supply pipe 102. The FIG. 2 embodiment also includes a regulated flow-reducing pathway comprising a recess section 120 and a bore section 130 connected in series between the inlet opening 112 and the two outlet cavities 114, 116. Bore section 130 of the regulated flow-reducing pathway is the same as bore section 30 in the FIG. 1 embodiment; but recess section 120 of the regulated flow-reducing pathway is of a different construction from recess section 20 in the FIG. 1 embodiment.

Thus, recess section 120 in the FIG. 2 embodiment includes a plurality of grooves 121a-121n connected in series between the inlet apertures 112 and the inlet groove 131 to bore 130. As shown in FIG. 2b, each of the grooves 121a-121n is defined by bottom face 122 and a pair of side faces 123, 124. Each groove further includes a flat-top projection 125 of rectangular cross-section integrally formed with the bottom face 122 of the groove 121, and of smaller height and thickness than the depth and width of the respective groove 121. Thus, each groove 121a-121n, together with its respective projection 125, defines, with the inner face of the water supply pipe 102, a restricted passageway 126 which reduces the flow of the water. Passageway 126 also changes in cross-sectional area in response to the pressure within the water supply pipe 102 so as to regulate the flow of the water in response to the water supply pressure.

As indicated above, bore 130 also changes its cross-sectional area in response to the pressure within the water supply pipe. Bore 130 therefore also aids in regulating the water flow to the outlet cavities connected, via the two outlet grooves 132, 133, to the outlet cavities 114, 116 in alignment with the outlet oplenings 104, 106 in the water supply pipe 102.

The drip irrigation apparatus illustrates in FIGS. 3-3g also includes a water supply pipe 202 formed with a plurality of pairs of outlet openings 204, 206, each pair being cooperable with a drip irgation unit 210. Each unit 210 is similarly constructed of an elastomeric cylindrical member as described above with respect to FIG. 1, to include a plurality of inlet openings 212 communicating with the interior of the water supply pipe 202, and a pair of annular outlet cavities 214, 216 in alignment with the outlet openings 204, 206 of the water supply pipe. As in the FIG. 1 embodiment, drip irrigation unit 210 is formed on its outer face with a regulated flow-reducing pathway comprising a recess formation 220 and a bore formation 230. Bore formation 230 is the same as described above with respect to FIGS. 1 and 2; but recess formation 220 is of a different construction.

Thus, as shown particularly in FIGS. 3 and 3e-3g, recess formation 220 comprises a plurality of annular recesses or grooves 221a-221n connected in series from the inlet openings 212 to the bore 230. Each of the annular recesses includes a central flat-top projection 222, as shown particularly in FIGS. 3f and 3g, of smaller height than the height of the recess. The inlet to each annular recess 221 is tangential so as to produce a cyclonic flow of the water therethrough, thereby reducing the rate of flow of the water. Because of the elastomeric nature of the irrigation unit 210, its wall is deformed under high pressure (FIG. 3g) to decrease the height of the annular flowpath 221, and thereby the volume of the flowpath, in response to the pressure within the water supply pipe 202, thereby regulating the flow of the water in response to changes in water supply pressure.

The construction and operation of drip irrigation 220, including its bore section 230, are otherwise the same as described above with respect to the FIGS. 1 and 2 embodiments.

While the invention has been described with respect to three preferred embodiments, it will be appreciated that these are set forth purely for purposes of example, and that many other variations, modifications and applications of the invention may be made.

What is claimed is:

1. A drip irrigation unit for insertion into a water supply pipe for reducing the flow through an outlet opening in the water supply pipe, comprising:

a cylindrical member of a deformable elastomeric material having an outer diameter substantially equal to the inner diameter of the water supply pipe and fixed therein with the outer face of the cylindrical member in contact with the inner face of the water supply pipe;

said cylindrical member being formed with an inlet opening therethrough from its inner face to its outer face for conducting the water from the interior of the water supply pipe to the outer face of the cylindrical member, an outlet cavity in the outer face of the cylindrical member alignable with the outlet opening in the water supply pipe, and a regulated flow-reducing pathway between said inlet opening and outlet cavity;

said regulated flow-reducing pathway including multiple, series-connected pressure-compensating chambers whose cross-sectional areas are changed by the deformation of the elastomeric cylindrical member to regulate the flow of the water in response to changes in the water supply pressure;

at least one of said multiple-pressure compensating chambers being constituted of a recess formation on the outer face of the cylindrical member and cooperable with the inner face of the water supply pipe.

2. The drip irrigation unit according to claim 1, wherein said recess formation defines a plurality of said pressure-compensating chambers connected in series.

3. A drip irrigation unit for insertion into a water supply pipe for reducing the flow through an outlet opening in the water supply pipe, comprising:

a cylindrical member of a deformable elastomeric material having an outer diameter substantially equal to the inner diameter of the water supply pipe and fixed therein with the outer face of the cylindrical member in contact with the inner face of the water supply pipe;

said cylindrical member being formed with an inlet opening therethrough from its inner face to its outer face for conducting the water from the interior of the water supply pipe to the outer face of the cylindrical member, an outlet cavity in the outer face of the cylindrical member alignable with the outlet opening in the water supply pipe, and a regulated flow-reducing pathway between said inlet opening and outlet cavity;

said regulated flow-reducing pathway including a recess formation on the outer face of the cylindrical member and cooperable with the inner face of the water supply pipe such that the cross-sectional area of at least a part of the recess formation is changed by the deformation of the elastomeric cylindrical member to regulate the flow of the water in response to changes in the water supply pressure;

said recess formation including a pair of parallel spaced grooves joined by a transverse groove of shallower depth than said parallel spaced grooves to define, with the inner face of the water supply pipe, a restricted passageway having a cross-sectional area which is changed by the deformation of the elastomeric cylindrical member to regulate the flow of water in response to changes in the water supply pressure.

4. The unit according to claim 3, wherein said recess formation includes a plurality of pairs of said parallel spaced grooves connected in series, with one groove of each pair joined to the other groove of the pair by a said transverse groove.

5. A drip irrigation unit for insertion into a water supply pipe for reducing the flow through an outlet opening in the water supply pipe, comprising:

a cylindrical member of a deformable elastomeric material having an outer diameter substantially equal to the inner diameter of the water supply pipe and fixed therein with the outer face of the cylindrical member in contact with the inner face of the water supply pipe;

said cylindrical member being formed with an inlet opening therethrough from its inner face to its outer face for conducting the water from the interior of the water supply pipe to the outer face of the cylindrical member, an outlet cavity in the outer face of the cylindrical member alignable with the outlet opening in the water supply pipe, and a regulated flow-reducing pathway between said inlet opening and outlet cavity;

said regulated flow-reducing pathway including a recess formation on the outer face of the cylindrical member and cooperable with the inner face of the water supply pipe such that the cross-sectional area of at least a part of the recess formation is changed by the deformation of the elastomeric cylindrical member to regulate the flow of the water in response to changes in the water supply pressure;

said recess formation including a groove bounded by a bottom face and a pair of side faces, and at least one flat-top projection integrally formed in the bottom face of said groove, and of smaller height and thickness than the depth and width, respectively, of said groove to define, with the inner face of the water supply pipe, a restricted passageway having a cross-sectional area that is changed by the deformation of the elastomeric cylindrical member to regulate the flow of water in response to changes in the water supply pressure.

6. The unit according to claim 5, wherein said groove includes a plurality of said projections spaced along the length thereof.

7. The unit according to claim 5, wherein said recess formation includes a plurality of said grooves connected in series, each formed with at least one of said flat-top projections.

8. A drip irrigation unit for insertion into a water supply pipe for reducing the flow through an outlet opening in the water supply pipe, comprising:

a cylindrical member of a deformable elastomeric material having an outer diameter substantially equal to the inner diameter of the water supply pipe and fixed therein with the outer face of the cylindrical member in contact with the inner face of the water supply pipe;

said cylindrical member being formed with an inlet opening therethrough from its inner face to its outer face for conducting the water from the interior of the water supply pipe to the outer face of the cylindrical member, an outlet cavity in the outer face of the cylindrical member alignable with the outlet opening in the water supply pipe, and a regulated flow-reducing pathway between said inlet opening and outlet cavity;

said regulated flow-reducing pathway including a recess formation on the outer face of the cylindrical member and cooperable with the inner face of the water supply pipe such that the cross-sectional area of at least a part of the recess formation is changed by the deformation of the elastomeric cylindrical member to regulate the flow of the water in response to changes in the water supply pressure;

said recess formation including a plurality of annular recesses connected in series to define, with the inner face of the water supply pipe, a plurality of annular flowpaths connected in series, each producing a cyclonic flow of the water therethrough and having a cross-sectional area which is changed by the deformation of the elastomeric cylindrical member to regulate the flow of water in response to changes in the water supply pressure.

9. A drip irrigation unit for insertion into a water supply pipe for reducing the flow through an outlet opening in the water supply pipe, comprising:

a cylindrical member of a deformable elastomeric material having an outer diameter substantially equal to the inner diameter of the water supply pipe and fixed therein with the outer face of the cylindrical member in contact with the inner face of the water supply pipe;

said cylindrical member being formed with an inlet opening therethrough from its inner face to its outer face for conducting the water from the interior of the water supply pipe to the outer face of the cylindrical member, an outlet cavity in the outer face of the cylindrical member alignable with the outlet opening in the water supply pipe, and a regulated flow-reducing pathway between said inlet opening and outlet cavity;

said regulated flow-reducing pathway including a recess formation on the outer face of the cylindrical member and cooperable with the inner face of the water supply pipe such that the cross-sectional area of at least a part of the recess formation is changed by the deformation of the elastomeric cylindrical member to regulate the flow of the water in response to changes in the water supply pressure;

said regulated flow-reducing pathway further including a bore extending transversely through a wall of the cylindrical member leading from a first point on its outer face to a second point on its outer face, said first point communicating with said recess formation, and said second point communicating with said outlet cavity, the cross-sectional area of said bore being changed by the deformation of the elastomeric cylindrical member to regulate the flow of water therethrough in response to changes in the water supply pressure.

10. The unit according to claim 9, wherein said bore is of elliptical cross-section, with its major axis extending parallel to the longitudinal axis of the cylindrical member.

11. The unit according to claim 9, wherein said outlet cavity is an annular recess formed in the outer face of the elastomeric cylindrical member.

12. The unit according to claim 9, wherein the elastomeric cylindrical member is formed with two outlet cavities, said second point of the bore being connected to a pair of grooves each leading to one of said outlet cavities.

* * * * *